United States Patent
Brody et al.

(10) Patent No.: US 8,167,233 B2
(45) Date of Patent: May 1, 2012

(54) COAXIAL ROTOR AIRCRAFT

(75) Inventors: David E. Brody, Greenwood Village, CO (US); Troy M. Gaffey, Granbury, TX (US); Frank Rixen, Hurst, TX (US); Richard F. Murray, Pantego, TX (US)

(73) Assignee: AVX Aircraft Company, Benbrook, TX (US)

( * ) Notice: Subject to any disclaimer, the term of this patent is extended or adjusted under 35 U.S.C. 154(b) by 590 days.

(21) Appl. No.: 12/229,928

(22) Filed: Aug. 28, 2008

(65) Prior Publication Data

US 2009/0159740 A1    Jun. 25, 2009

Related U.S. Application Data

(60) Provisional application No. 61/008,829, filed on Dec. 21, 2007.

(51) Int. Cl.
    *B64C 27/82* (2006.01)
(52) U.S. Cl. ................................. 244/17.21
(58) Field of Classification Search .......... 244/21, 244/6, 17.19, 17.23, 60, 17.21, 17.13
    See application file for complete search history.

(56) References Cited

U.S. PATENT DOCUMENTS

| | | | |
|---|---|---|---|
| 3,933,324 A | 1/1976 | Ostrowski | |
| 5,370,341 A | 12/1994 | Leon | |
| 5,791,592 A | 8/1998 | Nolan et al. | |
| 6,086,016 A | 7/2000 | Meek | |
| 6,460,802 B1 | 10/2002 | Norris | |
| 6,513,752 B2* | 2/2003 | Carter, Jr. | 244/8 |
| 7,168,656 B2 | 1/2007 | Pai | |
| 7,210,651 B2 | 5/2007 | Scott | |
| 7,229,251 B2 | 6/2007 | Bertolotti et al. | |
| 2006/0192046 A1* | 8/2006 | Heath et al. | 244/12.3 |
| 2006/0231677 A1* | 10/2006 | Zimet et al. | 244/17.23 |
| 2006/0269413 A1* | 11/2006 | Cotton et al. | 416/170 R |
| 2007/0215750 A1 | 9/2007 | Shantz et al. | |

* cited by examiner

*Primary Examiner* — Joshua J Michener
*Assistant Examiner* — Nicholas McFall
(74) *Attorney, Agent, or Firm* — Holland & Hart LLP (57) ABSTRACT

A dual, coaxial rotor helicopter is provided that is relatively easy to fly. Thrust is provided by two ducted fans that are mounted at the rear of the aircraft and spaced apart laterally. Differential thrust generated by the fans provides yaw control for the aircraft, and forward thrust is provided by the fans working in combination. The coaxial rotors are preferably utilized primarily for lift, and not for forward thrust, which simplifies the control requirements. The coaxial rotor with ducted fan configuration also results in lower vibratory loads being imposed on the helicopter, thereby increasing its speed capability. The fan ducts serve to protect the fans, augment the fan thrust at low airspeeds, increase the efficiency of the fans at cruise speeds, and provide horizontal and vertical stabilizing surfaces to ensure aircraft flight stability.

17 Claims, 12 Drawing Sheets

COAXIAL ROTOR AIRCRAFT

CROSS-REFERENCE TO RELATED APPLICATIONS

The present application claims priority from U.S. provisional application No. 61/008,829, filed 21 Dec. 2007, the entirety of which is incorporated by reference hereinto.

BACKGROUND OF THE INVENTION

1. Field of the Invention

The present invention relates generally to aircraft, and more specifically to an improved helicopter having coaxial, counter-rotating rotors.

2. Description of the Prior Art

Helicopters generally, and coaxial rotor helicopters in particular, have been known and practiced worldwide for many years. Helicopters have many advantages over fixed wing aircraft, including the ability to take off and land vertically, and to maneuver horizontally in any direction while airborne, including while in a hover at zero or near zero speed. This gives them a high degree of flexibility with regard to landing sites, and the ability to transport passengers and cargo to locations not accessible by fixed wing aircraft.

A disadvantage of helicopters with respect to fixed wing aircraft relates to their relative higher difficulty to fly. Fixed wing pilots seldom become helicopter pilots due to the increased time and expense required to master the additional complexities of helicopter piloting. This means that fixed wing pilots are often unable to take advantage of the helicopter's ability to be flown into areas not accessible to fixed wing aircraft. Furthermore, traditional helicopters are much more difficult to fly under instrument meteorological weather conditions (IMC) than fixed wing aircraft, generally limiting their operation under IMC or requiring costly artificial stabilization.

Traditional single rotor helicopters must utilize a tail rotor or similar thrust device acting around the yaw axis, generally referred to as an anti-torque device, in order to overcome the yawing moment naturally generated by the main rotor. This moment tends to yaw the fuselage in a direction opposite to the direction of main rotor rotation. Forward thrust to overcome drag must be provided by the same main rotor that generates the lift for the aircraft which, when combined with the need to control yaw, results in an aircraft that is more complex to control than a fixed wing aircraft.

The fuselage yaw moment imposed naturally by the main rotor can be eliminated through the use of coaxial, or tandem, counter-rotating main rotors, as known in the art. The natural yaw moment created by a single rotor is essentially cancelled by the second rotor, making yaw control in forward flight a matter of a relatively small power requirement. In conventional coaxial rotor and tandem rotor helicopters, forward thrust to overcome aerodynamic drag is generated by essentially the same mechanism used for a single rotor helicopter; forward thrust is created by tilting the main rotors forward to provide a forward vector component to the rotors' lift vector.

Small, dual coaxial rotor aircraft have been proposed in the art. For examples, patents have been issued to Leon, U.S. Pat. No. 5,370,341; Nolan et al, U.S. Pat. No. 5,791,592, and Norris, U.S. Pat. No. 6,460,802.

In addition, the science and application of coaxial rotor helicopters has been studied for many years. For example, a NASA report, *A Survey of Theoretical and Experimental Coaxial Rotor Aerodynamic Research*, Colin P. Coleman, NASA Technical Paper 3675 (1997), summarizes the state of the art of these aircraft as of the late 1990's, and references ongoing work and analysis from around the world. In addition, several Russian coaxial rotor designs have been in use for decades, primarily those built by Kamov.

One relatively new design currently available from Sikorsky, known as the X2, uses dual, coaxial rotors coupled with a rear propeller for forward thrust. For yaw control, the X2 utilizes differential collective pitch adjustment between the two rotors, giving a differential torque that provides yaw to the aircraft. Recently issued patents to Sikorsky for coaxial rotor helicopters include U.S. Pat. No. 7,210,651, to Scott, and U.S. Pat. No. 7,229,251, to Bertolotti et al.

However, the coaxial rotor aircraft currently available are still relatively complex for a pilot to fly. It would be desirable to provide an aircraft that combined the advantages of a helicopter with the simplicity of control of a fixed wing aircraft.

SUMMARY OF THE INVENTION

In accordance with the present invention, a dual, coaxial rotor helicopter is provided that is relatively easy to fly. Thrust is provided by two ducted fans that are mounted at the rear of the aircraft and spaced apart laterally. Differential thrust generated by the fans provides yaw control for the aircraft, and forward thrust is provided by the fans working in combination. The coaxial rotors are preferably utilized primarily for lift, and not for forward thrust, which simplifies the control requirements. The coaxial rotor with ducted fan configuration also results in lower vibratory loads being imposed on the helicopter, thereby increasing its speed capability. The fan ducts serve to protect the fans, augment the fan thrust at low airspeeds, increase the efficiency of the fans at cruise speeds, and provide horizontal and vertical stabilizing surfaces to ensure aircraft flight stability.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

It will be appreciated by those skilled in the art that the particular embodiment described herein illustrates the present invention. However, numerous variations on designs details may be made within the scope of the invention, as will become apparent. For example, the embodiment described herein illustrates a two or three place aircraft; however, the aircraft could be any size, larger or smaller, than the example shown.

Figure 1:
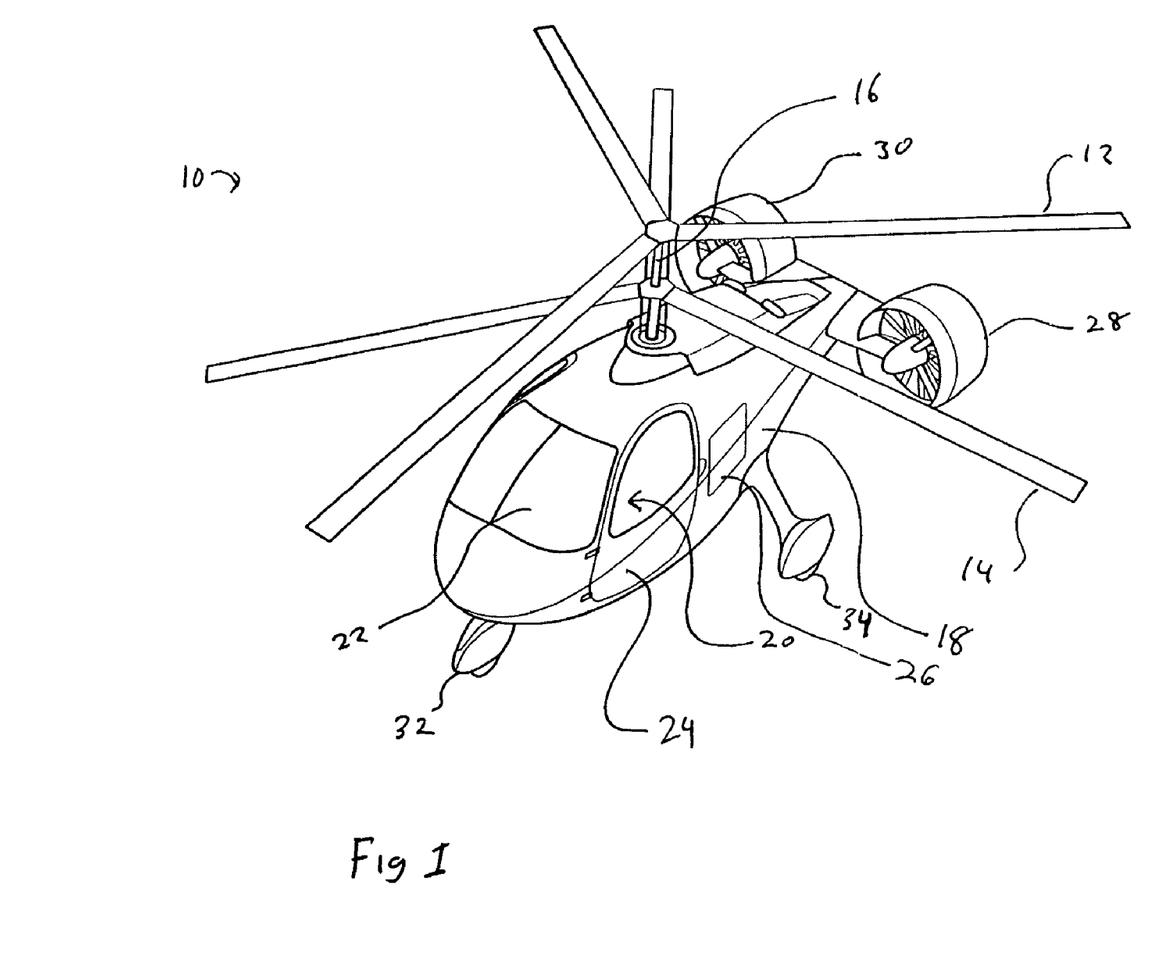
FIG. 1 is a perspective view of a preferred design for a coaxial rotor aircraft in accordance with the present invention.

Referring to FIG. 1, an aircraft designated generally with reference number 10 comprises a helicopter having dual, coaxial rotors for providing lift. An upper rotor 12 and a lower rotor 14 are coaxially mounted and rotate in opposite directions. In the embodiment shown, the upper rotor 12 rotates in the clockwise direction as seen from above, while the lower rotor 14 rotates in the counterclockwise direction. It will be appreciated that reversing the direction of rotation of both rotors will function equally well, and is a matter of design choice.

Rotors 12, 14 are mounted on a mast assembly 16, which projects from fuselage 18 at a location near the center of gravity of the aircraft. As described in more detail below, center of gravity location for the aircraft 10 is generally consistent with that of a conventional helicopter.

Aircraft 10 provides a forward passenger compartment 20, or cockpit, similar to a conventional helicopter. A windshield 22 provides for forward vision, and access doors 24 provide access to the cockpit. Cargo hatches 26 provide access to a relatively large cargo area located behind the cockpit/passenger compartment 20.

Mounted on the rear of the airframe are two ducted fans 28, 30, located on the left and right side of the aircraft, respectively. These fans 28, 30 provide forward and rearward thrust for the aircraft, and are used for yaw control as described below. The ducts themselves serve several functions, in addition to acting as protective shrouds around the fans. The ducts augment the fan thrust at low speed, and increase fan efficiency at higher speed (cruise) as known in the art. Further, the ducts serve as stabilizing surfaces at higher speed, replacing conventional helicopter horizontal stabilizer and vertical fins.

The preferred embodiment utilizes a tricycle landing gear with a front wheel 32 and 2 rear wheels 34 in a conventional arrangement. Alternative landing gear arrangements can be used, in a manner similar to traditional helicopters, as will be appreciated by those skilled in the art.

Figure 2:
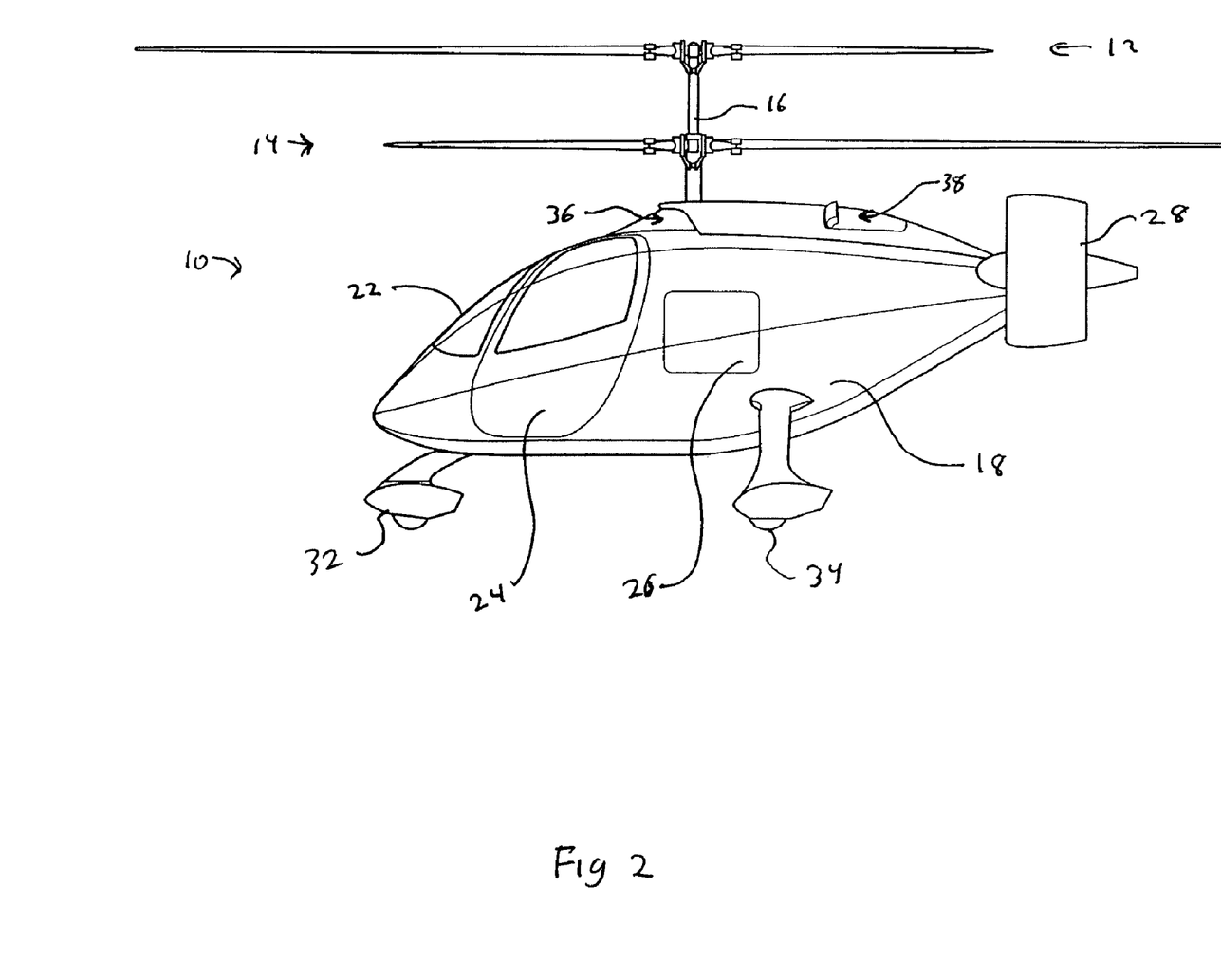
FIG. 2 is a side view of the aircraft of FIG. 1.

FIG. 2 is a side view of the aircraft of FIG. 1, and illustrates more clearly the vertical placement of the ducted fans 28, 30. The fans 28, 30 are located substantially along the vertical center of gravity of the aircraft, or slightly above this line. This prevents undue pitching moment of the aircraft when the fans 28, 30 are used for forward motion.

Air is provided for the engine through an intake 36 located on each side of the mast 16, with engine exhaust being vented through an exhaust opening 38 on each side of the aircraft.

Figure 3:
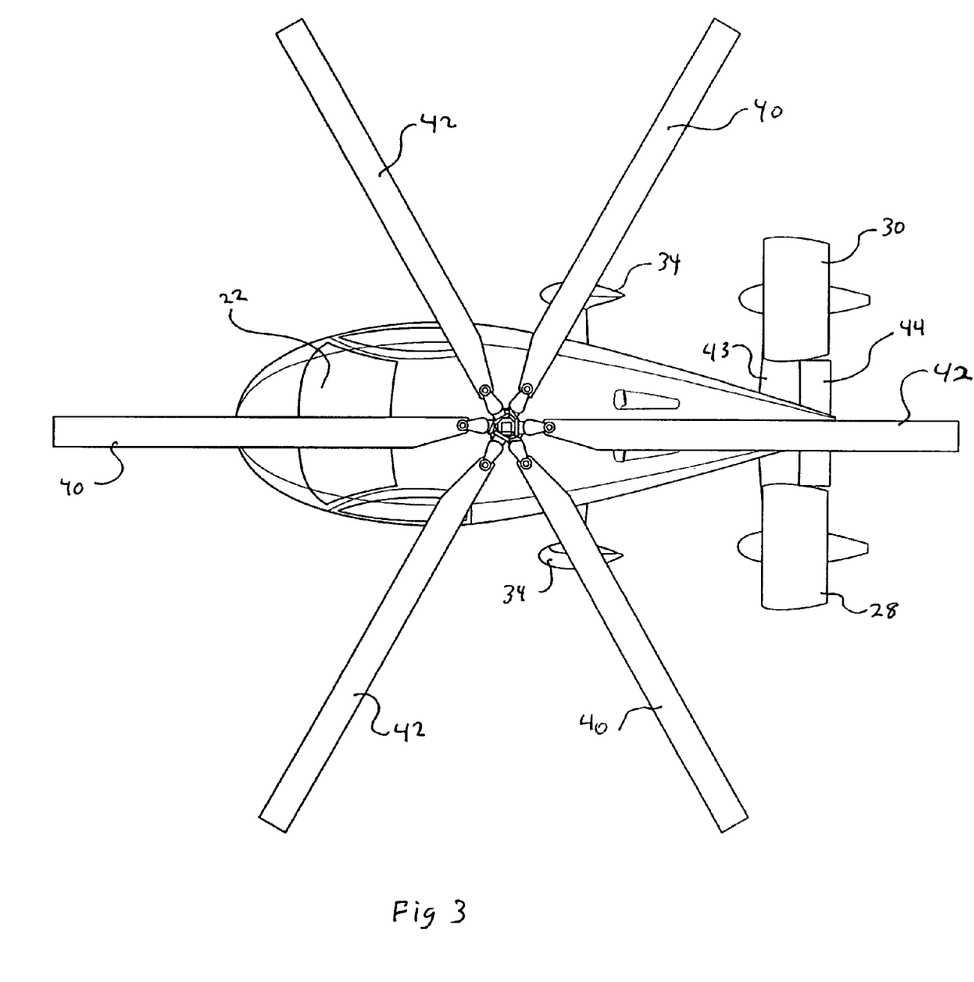
FIG. 3 is a top view of the aircraft of FIG. 1.

FIG. 3 is a top view of the preferred aircraft. Rotor blades 40 of upper rotor 12 rotate in a clockwise direction as seen from above. Blades 42 of lower rotor 14 rotate in a counterclockwise direction as seen in the figure.

The ducted fans 28, 30 are seen to be equally spaced from the centerline of the aircraft. Between them is an empennage support structure 43 which can support an elevator 44 used for pitch control during forward flight. If desired, the elevator 44 can be made smaller, or even eliminated in some configurations, and cyclic control of the rotors 12, 14 used for pitch control as known in the art. The shell of the airframe has a teardrop shape, providing maximum room for the pilot and passengers and enough clearance to provide clean airflow into the ducted fans 28, 30. The airframe is widest near the back of the cockpit, approximately in line with the shoulders of the seated pilot and passengers.

Figure 4:
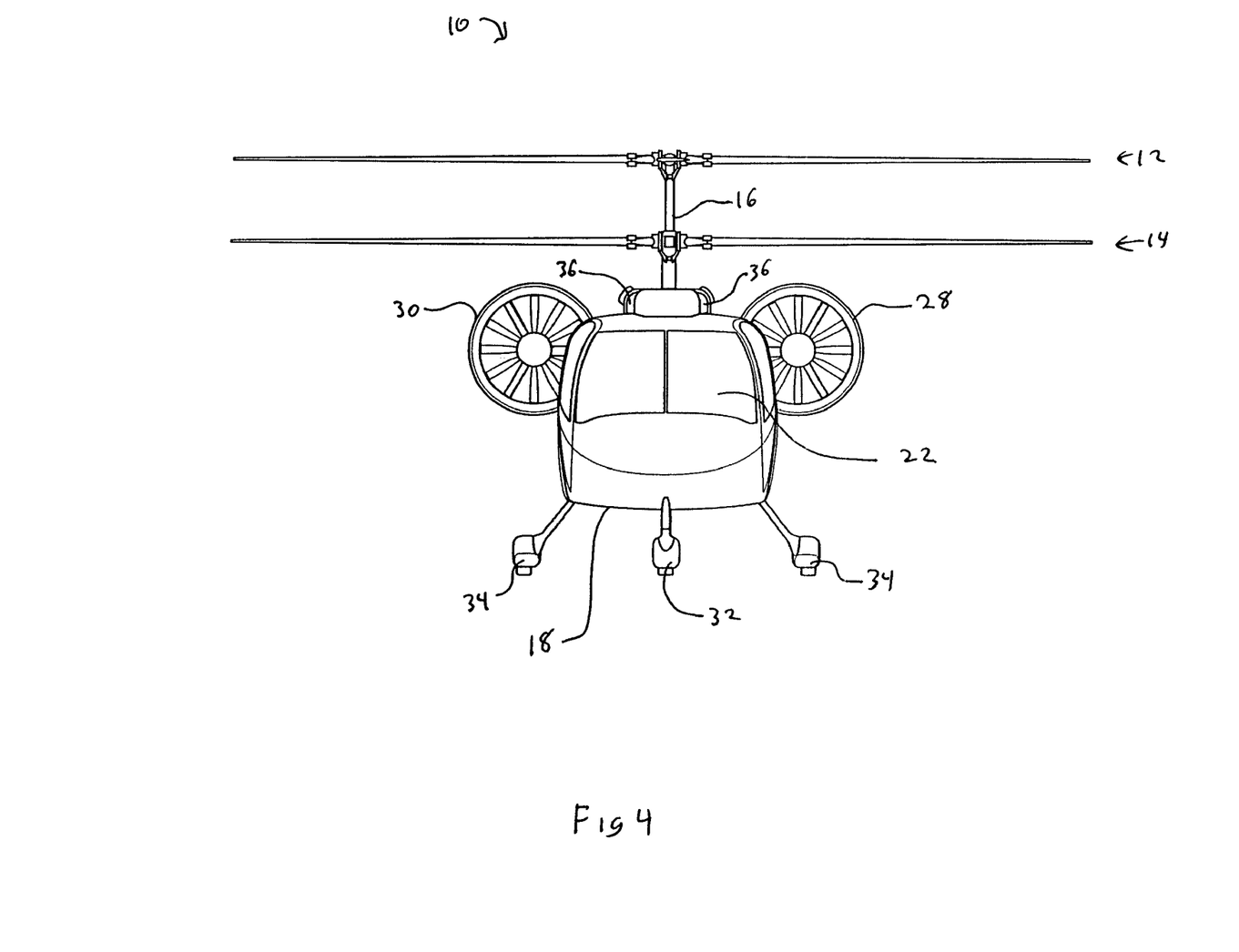
FIG. 4 is a front view of the aircraft of FIG. 1.
Figure 5:
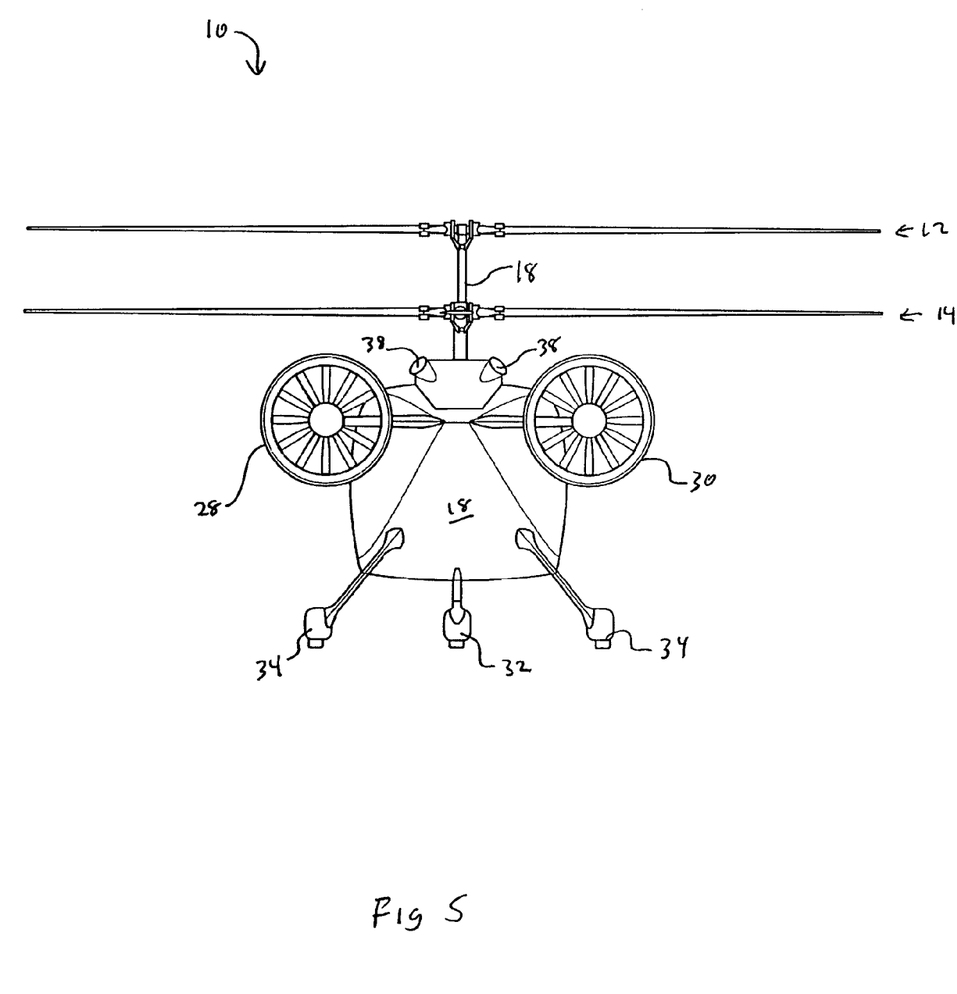
FIG. 5 is a rear view of the aircraft of FIG. 1.

FIG. 4 is a front view of the aircraft. It can be seen that the ducted fans are mostly unobstructed by even the widest part of the airframe, and the teardrop shape shown in FIG. 3 ensures that the fans 28, 30 operate in an unobstructed manner. FIG. 5 is a rear view, in which the relatively unobstructed nature of airflow through the ducted fans 28, 30 can be clearly seen.

Figure 6A:
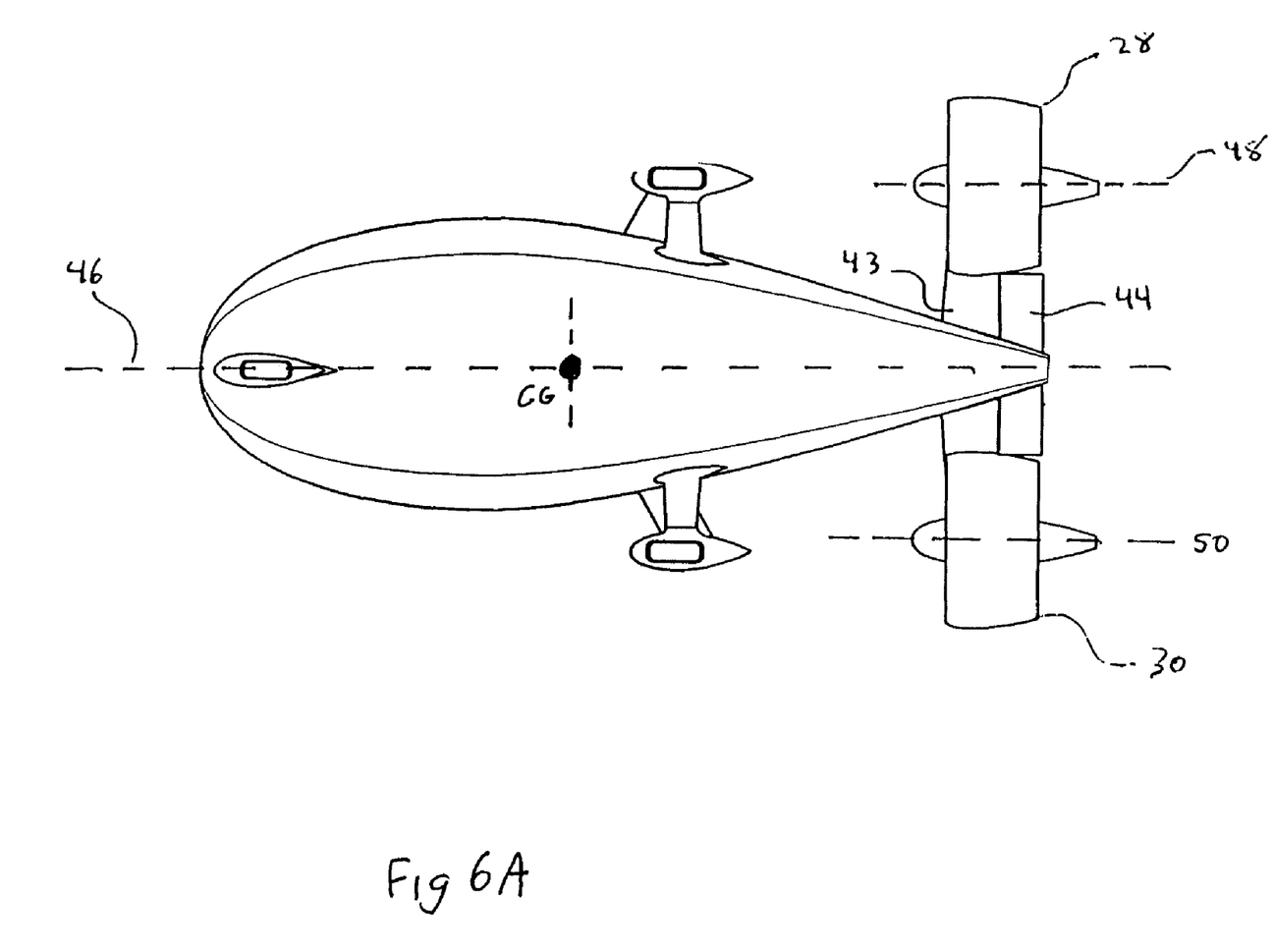
FIG. 6A is a view from beneath the preferred aircraft illustrating aspects of thrust.

FIG. 6A is a view of the fuselage from underneath, and illustrates the principles use for yaw control. The aircraft center of gravity (CG) is located along the aircraft centerline 46. The CG is located slightly in front of the mast, making the CG close to the center of lift provided by the rotors. Lines 48 and 50 indicate the axes of thrust of the left and right ducted fans, respectively.

Because the ducted fans are spaced laterally with respect to the centerline 46 of the aircraft, each fan will contribute a yaw force in its respective direction. In normal forward flight, the thrust provided by the ducted fans is the same. This balanced thrust results in no net yaw, and the aircraft will not turn. In order to yaw the aircraft in forward flight, the thrust provided by the fans is made unequal, which results in a net torque around the CG.

As shown in the Figures, the ducted fans are illustrated with their centerlines parallel to the aircraft centerline. If desired, the ducted fans can have centerlines that are not parallel to the aircraft centerline. In such case, the angles made by the two ducted fans should be the same with respect to the aircraft centerline, and of opposite direction. In some cases, for example, pointing the two ducted fans 2 or 3 degrees outside of parallel gives additional yaw force when the fans provide unequal thrust, while pointing the ducted fan centerlines inward, towards the aircraft CG, reduces the yaw force caused by a given thrust differential between the fans.

Figure 6B:
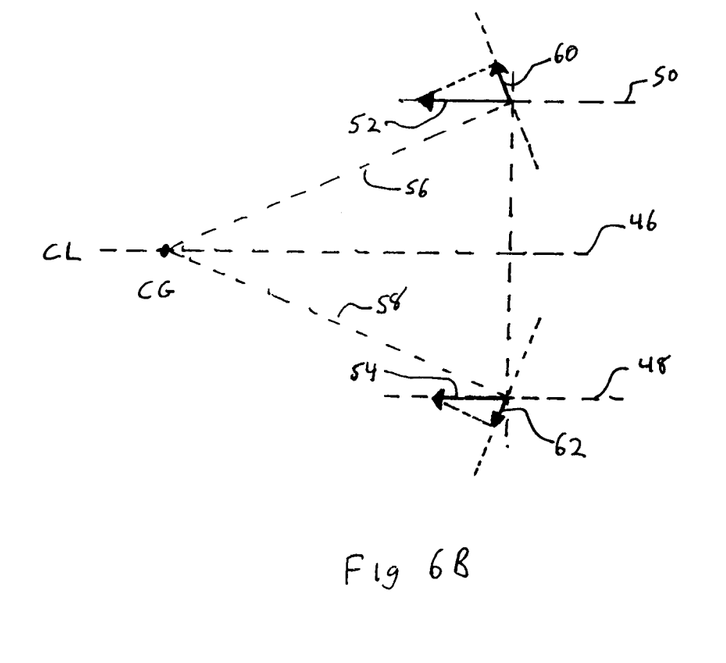
FIGS. 6B and 6C are diagrams illustrating thrust vectors affecting yaw of the preferred aircraft.

FIG. 6B is a view from above showing vectors of the forces used to generate yaw during forward flight. Arrow 52 represents the forward thrust generated by the right ducted fan 30, while arrow 54 represents the thrust generated by left ducted fan 28. In this example, right ducted fan 30 generates more thrust than left ducted fan 28.

Lines 56, 58 represent the direction from the center point of thrust of each fan to the aircraft CG. Arrows 60, 62 represent that component of thrust vectors 52, 54, respectively, that is at right angles to lines 56, 58. This represents the force, generated by the respective ducted fan, that goes toward yawing the aircraft around its CG.

In FIG. 6B, vector arrow 52 is longer than arrow 54, indicating that right fan 30 is generating greater thrust than left fan 28. This results in yaw vector 60 being larger than yaw vector 62, resulting in a net yaw torque in a counterclockwise direction around the CG. Increasing the thrust differential between the two ducted fans will increase the yaw moment in the appropriate direction.

Figure 6C:
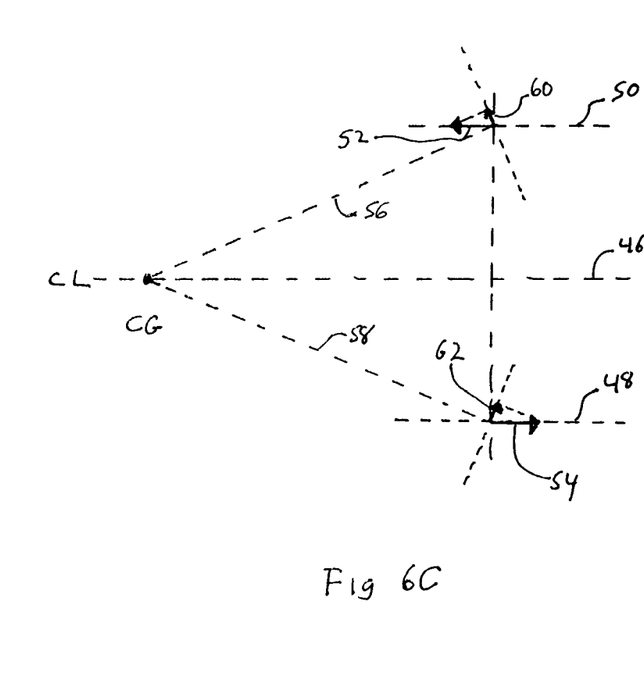

In theory, one fan could be idled with the other thrusting in order to generate yaw. However, the forward portion of the thrust vector will cause the aircraft to slew forward as well as yaw, so this approach cannot be used in hover mode. FIG. 6C indicates that, when the aircraft is in hover, one ducted fan is preferably pitched to generate reverse thrust while the other generates forward thrust. By matching the thrust generated by the two ducted fans, their forward thrust components approximately cancel out, leaving both fans contributing primarily only to yaw. This allows the aircraft to be easily yawed during hover.

The aircraft described above has a number of advantages over both fixed wing and helicopter aircraft; the design tends to combine the benefits of both types of design. In level forward flight, lift is provided by the coaxial rotors while forward thrust is provided by the ducted fans. This results in the aircraft being level during forward flight, rather than tilted forward as is the case with conventional helicopter flight. The aircraft can ascend or descend with the fuselage level by changing the rotor collective pitch and adjusting cyclic to maintain a level fuselage attitude. If desired, the aircraft can ascend and descend by increasing or decreasing fan pitch to vary fan thrust, and pitching the fuselage nose up or nose down using cyclic pitch to maintain constant airspeed.

Since the rotors are used only for lift in forward flight, and the lift is balanced because of the counter-rotating rotors, the aircraft can obtain greater forward speeds than are normally obtainable in a helicopter. Forward thrust is controlled by varying the pitch of the ducted fans, which are independently controllable to allow for yaw control. The pitch of the fans can be reversed, even during flight, allowing fan thrust to slow the forward notion of the aircraft during level flight, or even back the aircraft up should such be necessary or desirable.

Pitch control is provided by traditional cyclic control, augmented by an elevator if desirable. Roll is provided by traditional helicopter cyclic control. A conventional cyclic stick similar to that used in traditional helicopters may be used, or a non-conventional side arm stick may be used. Yaw control is provided by differential thrust between the two ducted fans, controlled by either conventional pedals or by twisting the sidearm stick. Because the coaxial rotors essentially cancel out unwanted yaw torque, very little thrust differential is required to yaw the aircraft.

Control of fan blade cyclic pitch can be by a twist grip mounted on the main rotor collective pitch lever. Other means can be used, such as a 3-way, momentary contact switch known in the industry as a beep switch.

While forward thrust can be provided by traditional helicopter control of the rotors, it is anticipated that such control will not be used with the preferred embodiment in favor of thrust provided by the ducted fans. This allows the aircraft to be flown in a manner somewhat similar to a fixed wing aircraft, allowing fixed wing pilots to transition more easily into this helicopter design. It also reduces main rotor thrust requirements and vibratory loads.

Figure 7:
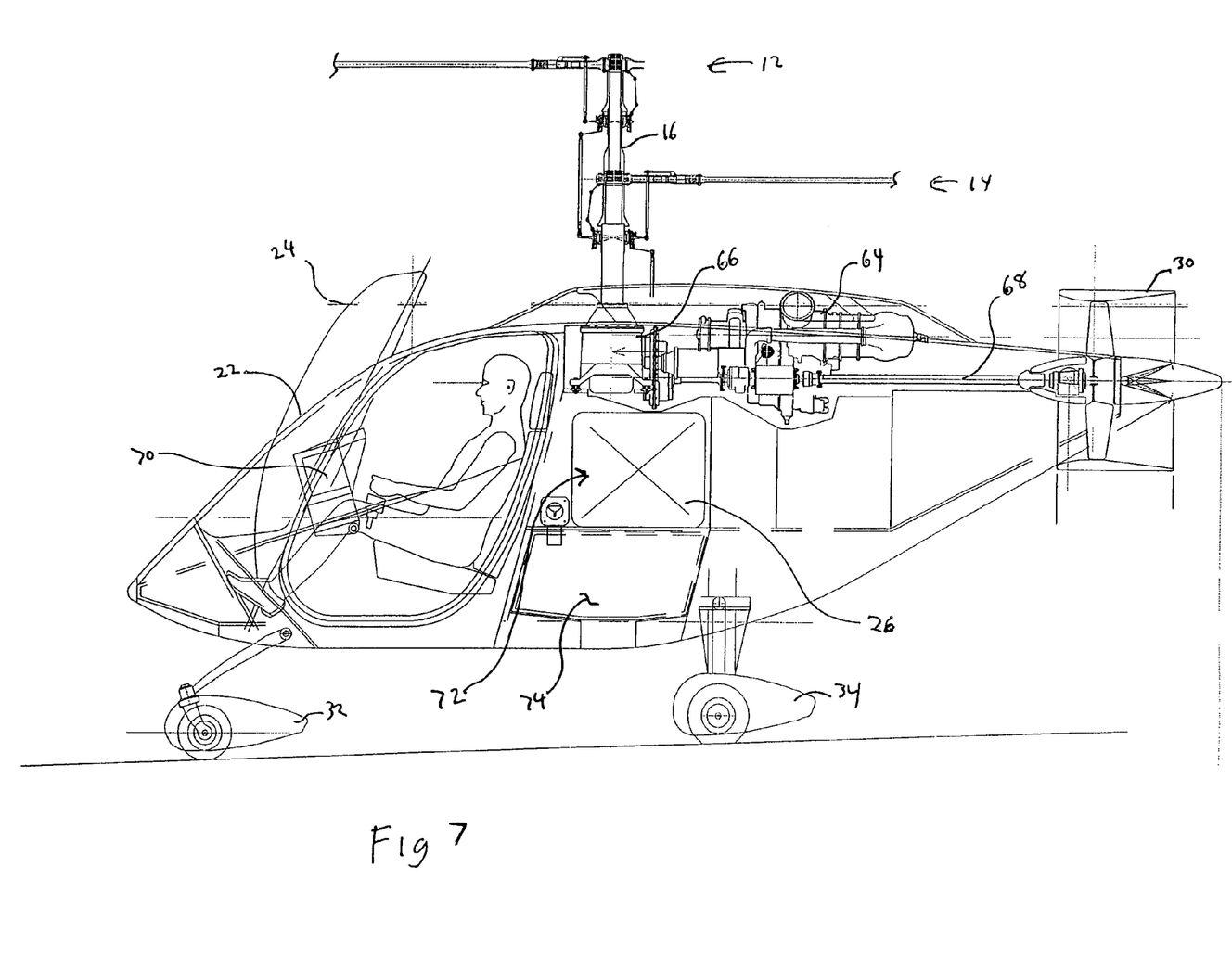
FIG. 7 is a side partial cut-away view of the aircraft of FIG. 1.

Additional details of the preferred embodiment are illustrated beginning with FIG. 7. FIG. 7 is a section of the aircraft shown from the left side. As previously described, the mast is mounted near the longitudinal CG of the aircraft. An engine 64, preferably a turbine engine such as those typically used for helicopters, is mounted behind the mast. Multiple turbine engines can be used if desired. Engine 64 is connected to the mast 16 through main transmission 66, and drives inner and outer mast portions in opposite directions at the same speed, as known in the art. A drive shaft 68 extends to the rear to drive the ducted fans 28, 30, and interconnects the fans to the main rotor drive shaft. Engine 64 preferably drives the aircraft drive system through a passive one way clutch, typical of helicopters, which allows torque to be transmitted in the power direction but not in the opposite direction. This allows the rotors to drive the drive system and its components, including the ducted fans, in the event of loss of power from the engine(s).

Traditional flight controls 70 are provided to the pilot, and may be any of several known, suitable designs. In the preferred embodiment, the pilot is seated on the left side of the cabin, and either one or two passenger seats are provided to the pilot's right. In a two-seater arrangement, dual flight controls can be provided. The pilot can also be seated on the right side of the cabin, with the passengers to the left. Larger or smaller aircraft built utilizing this design approach can place the pilot in the most convenient or useful location, including the aircraft centerline.

A cargo storage region 72 is provided immediately behind the cabin, and extends across the width of the aircraft. A fuel cell 74 is located below cargo storage 72. As can be seen, and as is typical with helicopter design, the locations that will vary in weight (passengers, fuel, cargo) are located near the center of gravity in order to minimize CG location shift as loadings change.

Figure 8:
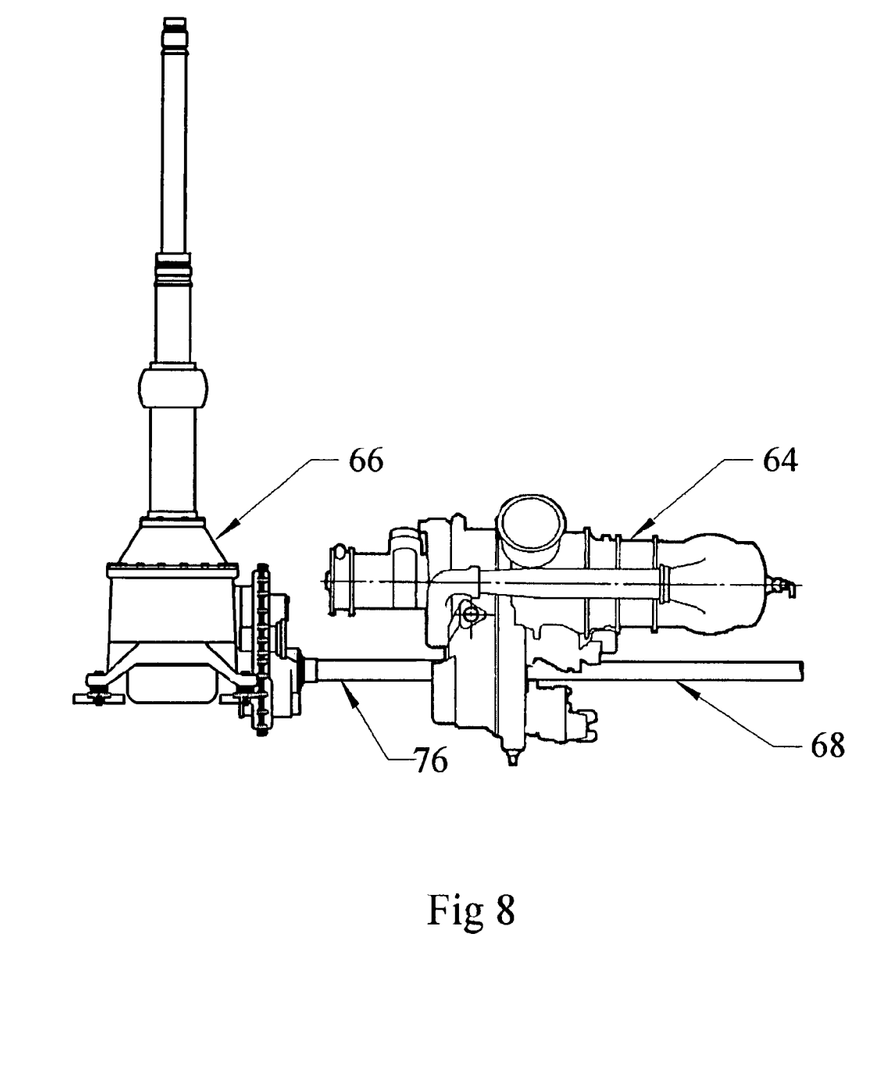
FIG. 8 is a diagram of the power train for the preferred aircraft.

FIG. 8 is an enlargement of part of the drive system showing additional detail thereof. Engine 64 can be any suitable engine designed for helicopter work; an example of a suitable engine is the Rolls Royce (RR) Model 250 C20R currently widely available. A main drive shaft 76 extends forward to main transmission 66, which accepts the engine power and transfers it at a 90 degree angle to the two counter-rotating rotors. The engine speed is reduced via an engine speed reduction/engine accessory gear box as known in the art. The engine speed is further reduced in the main transmission to the desired rotor speed, also as known in the art.

Figure 9:
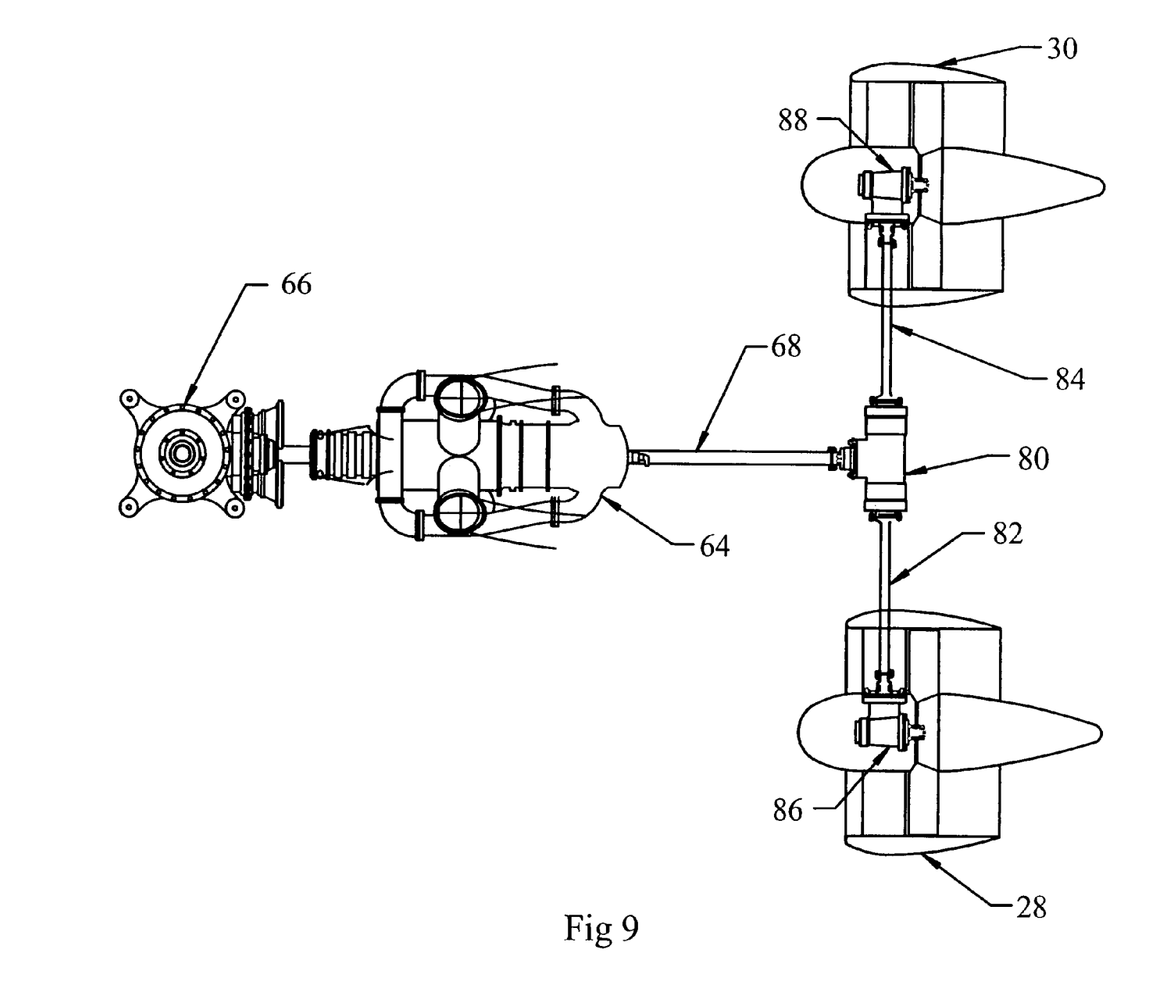
FIG. 9 is a diagram of the power system for the ducted fans for the preferred aircraft.

FIG. 9 illustrates a preferred arrangement for the drive system for the ducted fans. Power is supplied to a center "T" gear box assembly 80 through drive shaft 68. Left and right fan drive shafts 82, 84 are connected to left and right fan gearboxes 86, 88, which in turn drive the respective ducted fans. As previously noted, in the preferred embodiment both fans rotate in the same direction (clockwise looking forward), which allows use of the same parts for much of the left and right side assemblies for the ducted fans. However, the fans can rotate in opposite directions if desired.

Figure 10:
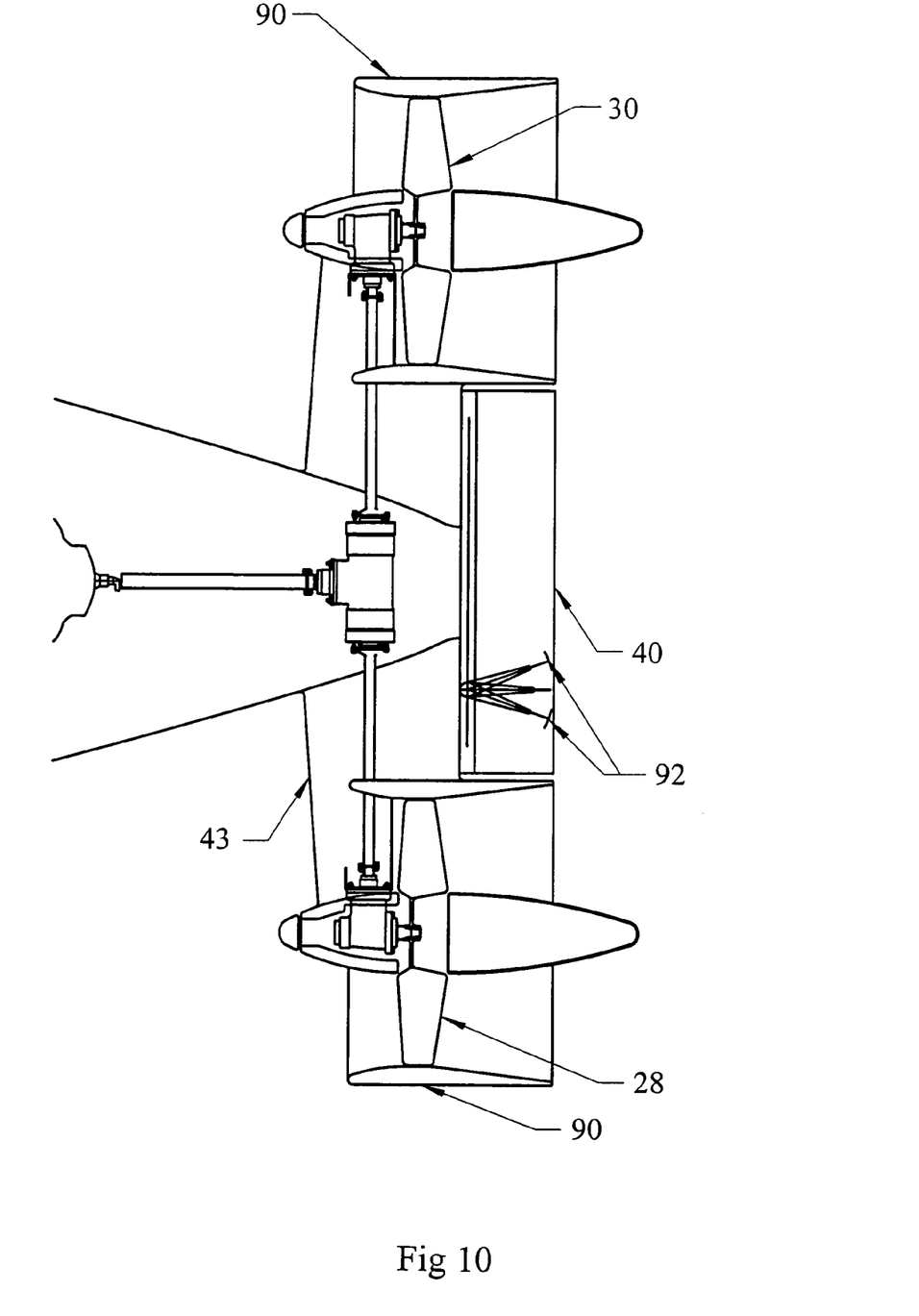
FIG. 10 is a diagram of the rear portions of the preferred aircraft.

FIG. 10 illustrates details of the rear structure of the aircraft as seen from above. Left and right ducted fans 28, 30 are enclosed within fan shrouds 90 that allow for controllable operation as known in the art. Elevator 44 is shown as extending essentially the whole distance between the shrouds 90, but as previously described may be made smaller or larger as desired. Actuators 92 are used to position elevator 44. Elevator 44 is preferably located in the same plane as the center shafts for the ducted fans 28, 30.

Figure 11:
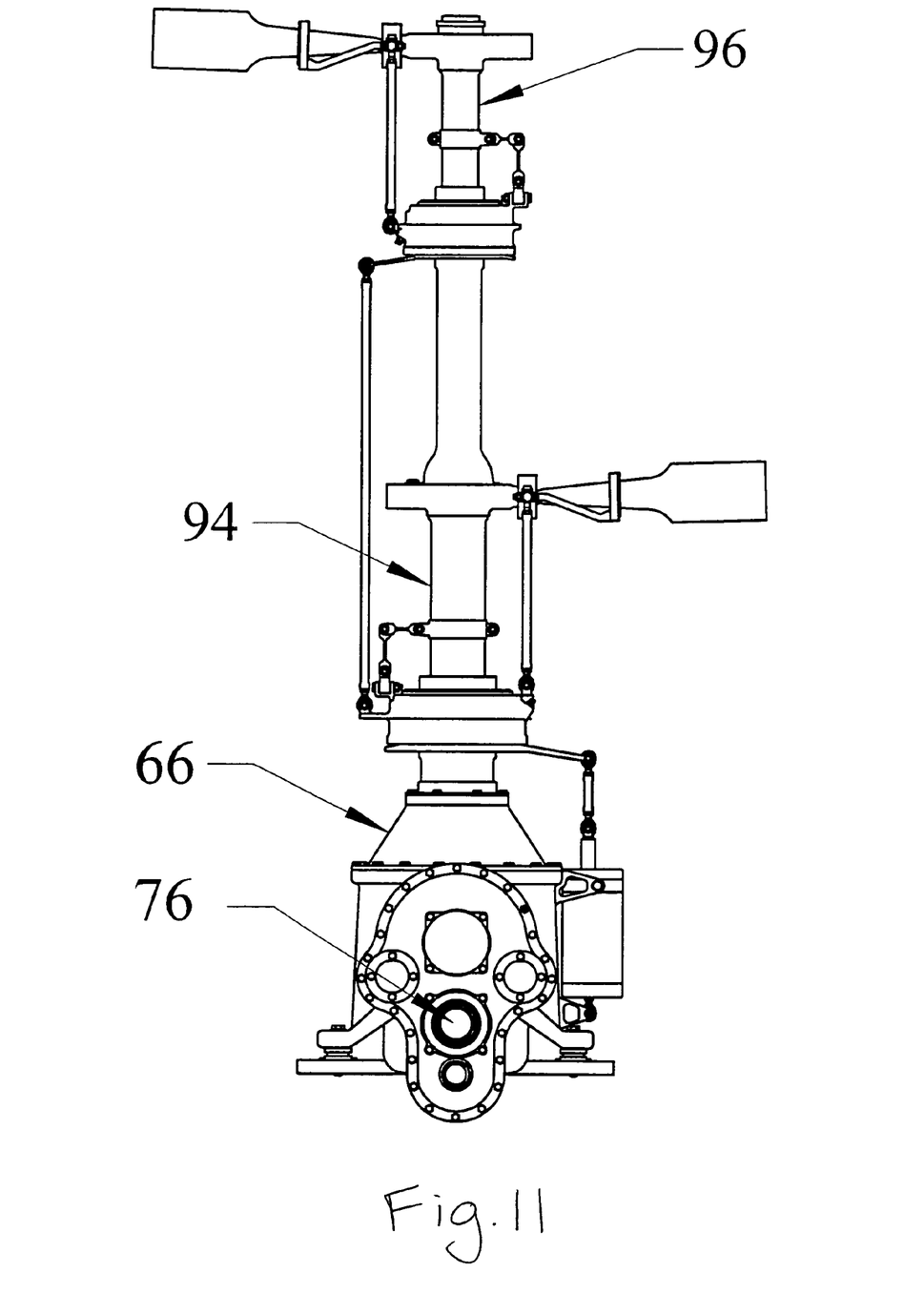
FIG. 11 illustrates additional details of the main mast of the preferred aircraft.

FIG. 11 illustrates additional details of the main mast assembly. Drive shaft 76 drives transmission 66, which in turn drives the outer mast 94 and inner mast 96 in opposite directions as known in the art. In a preferred embodiment, three actuators are provided on the main mast, spaced 120 degrees apart, for cyclic and collective control. Illustrated in FIG. 11 are the required linkages for a single actuator. In the illustrated embodiment, the main rotor system consists of three actuator packages that are attached between the transmission and lower swashplate and provide collective and cyclic control inputs to both rotors via the upper and lower swashplates. Other coaxial rotor designs may be used as known in the art, with simplification in some cases because neither yaw control nor forward thrust are required form the rotors in the design described herein.

Flight control is preferably performed through a flight control computer, but some or all of the flight controls can be implemented as mechanical controls if desired. In general, the preferred embodiment con be operated using standard helicopter flight controls, with the changes described above related to control of the ducted fans. In general, the overall control of the aircraft is somewhat simpler than that of a standard helicopter, and can be more easily learned by a fixed-wing pilot.

Additional features of the aircraft are within the purview of a person of skill in the art. For example, the preferred aircraft can use variations on standard avionics as desired, and many structural and design details are very much like those of a conventional helicopter, except for the changes described needed to accommodate the dual ducted fans. Selection of design details is easily accomplished by such a person of ordinary skill.

Numerous advantages of the described design will be appreciated by those skilled in the art. One important advantage of the present design is the control of the aircraft that is available on the ground. With available coaxial rotor designs, yaw control is performed by changing the collective of the two rotors in different directions to provide a net torque around the mast. However, on the ground this approach is not viable, as the rotors are providing essentially no lift. This leaves a conventional coaxial rotor design without a good method for steering on the ground.

With the design described herein, ground maneuvering is very similar to that of a fixed wing aircraft. The nose wheel need not be steerable; it can be a freely pivoting wheel such as is available on small fixed wing aircraft. Yaw control is provided by using differential thrust on the ducted fans, and the horizontal thrust of the fans provides an easily controlled forward motion. This allows the aircraft to be easily maneuvered on the ground. Because the ducted fans can be separately pitched in reverse as described above, the aircraft is relatively nimble during ground maneuvers.

It will also be appreciated that aircraft of various sizes can easily be built using the techniques described herein. The embodiment described herein is for a small, two or three person aircraft. However, it is easily seen that larger aircraft can be built using the technology described herein. For example, a 10-15 passenger design would utilize a larger airframe similar to those currently used in conventional helicopters. Power requirements would be increased, and the rotors and fans would be enlarged and made capable of handling higher loads. However, the overall design would remain essentially the same as that described herein, except for the scaling issues normally encountered when moving from smaller to larger helicopters. Inasmuch as coaxial rotor helicopters of varying capacities are known in the art, such scaling issues are well within the understanding of a skilled practitioner in this field.

The coaxial rotor design gives greater lift for a given rotor planform area than a single rotor design, due to the extra blades. Because the rotors are not intended to be used for forward thrust, the power requirement for the rotors is lessened compared to a conventional design. Higher flight speeds are achievable because the coaxial rotors allow non-tilted, horizontal flight, which eliminates significant drag caused by the nose-down attitude required by a conventional helicopter. Normal parasitic drag caused by yaw control is also eliminated using the present design. These factors result in the ability to manufacture helicopters that are quite competitive in terms of cost, payload, flight speed, and range.

As will be appreciated by those skilled in the art, the improved aircraft design described herein provides an aircraft that is easily handled and maneuvered, while combining the maneuverability and hover advantages of a helicopter with the higher speed forward flight of a traditional fixed wing aircraft. The counter-rotating rotor design essentially eliminates rotor yaw, and the need for a tail rotor, while the twin ducted fans provide both forward thrust and yaw control. This results in an aircraft that is, in general, as easily handled as a fixed wing aircraft, while still providing the benefits of the helicopter design.

While the invention has been particularly shown and described with reference to a preferred embodiment, it will be understood by those skilled in the art that various changes in form and detail may be made therein without departing from the spirit and scope of the invention.

What is claimed is:

1. An aircraft, comprising:
   a fuselage;
   a single engine powerplant;
   a rotor mounted on a mast and projecting above the fuselage, adjacent a longitudinal center of gravity of the aircraft, wherein the rotor is driven by the powerplant and generates lift for the aircraft; and
   left and right ducted fans each fan having a plurality of blades attached to the fuselage at a rear portion thereof, on left and right sides of an aircraft centerline, respectively, and spaced laterally from the centerline; and
   a stick control operatively coupled with a flight control computer such that movement of the stick control is translated by the flight control computer into mechanical operational control of at least the left and right ducted fans;
   the powerplant positioned closely adjacent the longitudinal center of gravity of the aircraft, between the mast and the first and second propulsion units; the powerplant including a main shaft that extends in a first direction and is operatively coupled with a main transmission associated with the mast; the powerplant further including an auxiliary shaft that extends in a second direction, away from the first direction, and is operatively coupled with an auxiliary transmission associated with the left and right ducted fans;
   wherein the first and second propulsion units provide forward thrust to the aircraft, and wherein each propulsion unit is separately controllable through rotation of the control stick, causing the flight control computer to initiate non-symmetrical thrust to the first and second propulsion units, whereby aircraft yaw control is provided by such non-symmetrical thrust.

2. The aircraft of claim 1, wherein the rotor comprises two rotors, and wherein the two rotors are coaxial and counter-rotating.

3. The aircraft of claim 1, wherein each ducted fan utilizes a collective blade pitch control to control the amount of thrust provided by such fan.

4. The aircraft of claim 3, wherein the collective blade pitch of each ducted fan can be controlled to provide reverse pitch, whereby reverse thrust can be generated by each ducted fan independently of the other.

5. The aircraft of claim 1, wherein the first ducted fan and second ducted fan both rotate about an axis in the same direction.

6. The aircraft of claim 1, wherein the first and second propulsion units are further independently controllable to provide reverse thrust to the aircraft.

7. The aircraft of claim 1, wherein:
   a roll moment is generated when the control stick is pivoted to one side or another, causing the flight control computer to initiate movement of the rotors in a manner that roll the aircraft while in flight; and
   a pitch moment is generated when the control stick is pivoted forward or aft, causing the flight control computer to initiate movement of the rotors in a manner that pitches the aircraft while in flight.

8. The aircraft of claim 1, wherein rotor collective, first and second propulsion unit collective, and throttle control are simultaneously altered through movement of a second control stick.

9. An aircraft, comprising:
a fuselage having a centerline extending in a forward/aft direction;
a single engine powerplant connected to the fuselage;
a mast projecting above the fuselage, adjacent a longitudinal center of gravity of the aircraft, and carrying coaxial, counter-rotating rotors driven by the powerplant;
left and right ducted fans each having a plurality of blades, and connected to the fuselage at a rear thereof and driven by the powerplant, wherein the left and right ducted fans are spaced away from the aircraft centerline and provide thrust in a direction approximately parallel to the centerline; and
a stick control operatively coupled with a flight control computer such that movement of the stick control is translated by the flight control computer into mechanical operational control of at least the left and right ducted fans;
the powerplant positioned closely adjacent the longitudinal center of gravity of the aircraft, between the mast and the left and right ducted fans; the powerplant including a main shaft that extends in a first direction and is operatively coupled with a main transmission associated with the mast; the powerplant further including an auxiliary shaft that extends in a second direction, away from the first direction, and is operatively coupled with an auxiliary transmission associated with the left and right ducted fans;
wherein the left and right ducted fans are independently controllable to generate thrust, whereby a yaw moment is generated when the control stick is rotated, causing the flight control computer to initiate differential thrust by the left and right ducted fans.

10. The aircraft of claim 9, wherein the thrust generated by the left and right ducted fans is controlled by controlling the pitch of their respective blades.

11. The aircraft of claim 10, wherein the thrust generated by the left and right ducted fans is controlled by controlling the collective pitch of their respective blades.

12. The aircraft of claim 10, wherein the pitch of the ducted fan blades can be controlled to provide reverse thrust.

13. The aircraft of claim 9, wherein the left and right ducted fans each rotate about an axis that is approximately parallel to the aircraft centerline.

14. The aircraft of claim 13, wherein the left and right ducted fans each rotate about an axis that is within approximately 3 degrees of parallel to the aircraft centerline.

15. The aircraft of claim 13, wherein the left and right ducted fans rotate in the same direction.

16. The aircraft of claim 13, wherein the left and right ducted fans rotate in opposite directions.

17. The aircraft of claim 9, further comprising:
left and right power take-off assemblies connecting the auxiliary transmission to the left and right ducted fans, respectively.

* * * * *